No. 682,243. Patented Sept. 10, 1901.
G. W. CUSCADEN, C. F. KLOTZ & H. A. CUSCADEN.
MACHINE FOR MOLDING ICE CREAM.
(Application filed July 3, 1901.)
(No Model.)
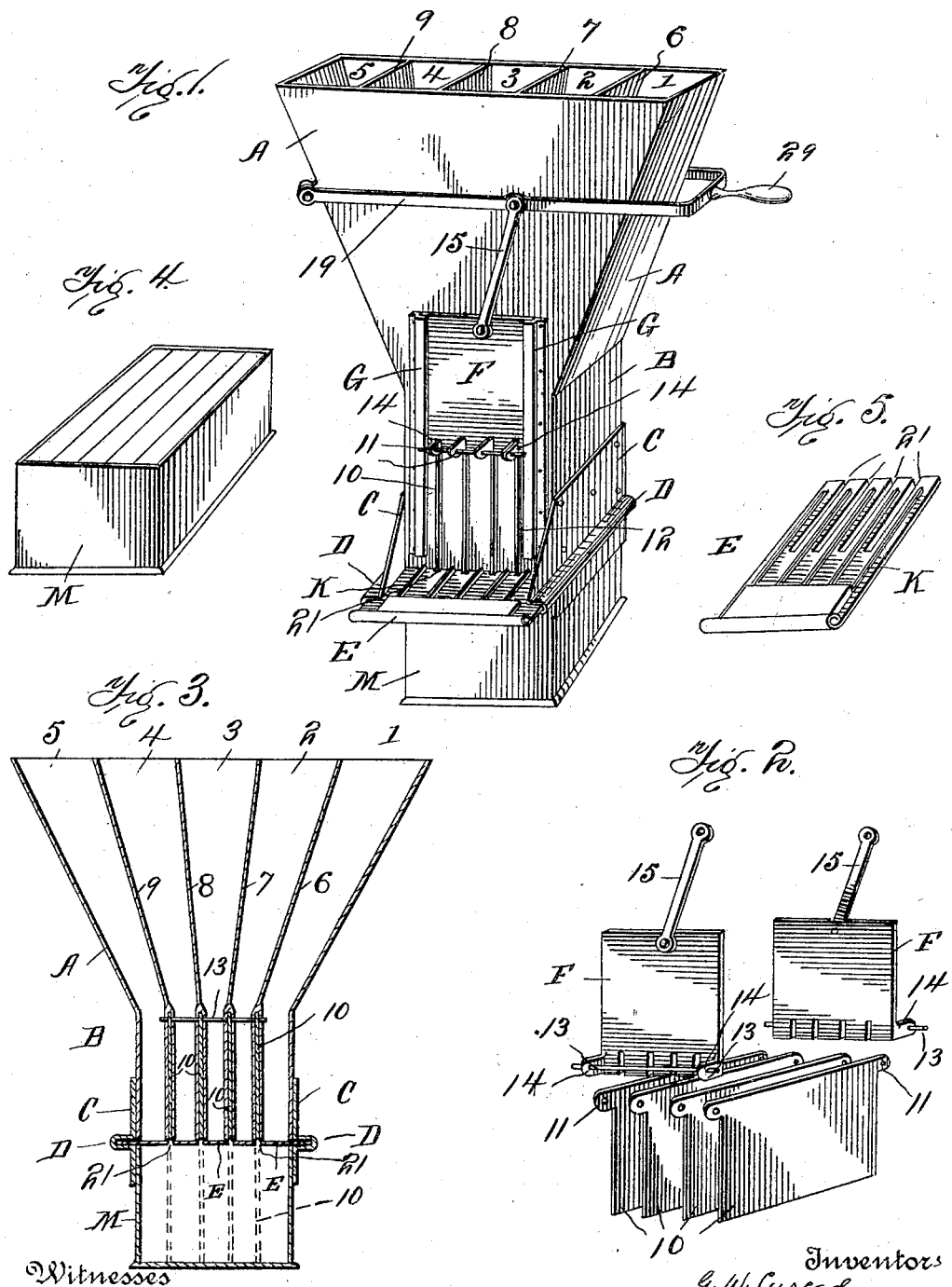

UNITED STATES PATENT OFFICE.

GEORGE W. CUSCADEN, CHARLES F. KLOTZ, AND HARRY A. CUSCADEN, OF LOUISVILLE, KENTUCKY.

MACHINE FOR MOLDING ICE-CREAM.

SPECIFICATION forming part of Letters Patent No. 682,243, dated September 10, 1901.

Application filed July 3, 1901. Serial No. 67,033. (No model.)

*To all whom it may concern:*

Be it known that we, GEORGE W. CUSCADEN, CHARLES F. KLOTZ, and HARRY A. CUSCADEN, residing at Louisville, in the county of Jefferson and State of Kentucky, have invented certain new and useful Improvements in Machines for Molding Ice-Cream, of which the following is a specification, reference being had therein to the accompanying drawings.

This invention relates to machines for molding ice-cream into blocks or bricks having layers of different colors or flavors.

The object of the invention is to produce a machine whereby layer blocks of ice-cream and similar confections can be readily produced.

Figure 1 is a perspective view of a machine having a mold for a brick or block attached. Fig. 2 is a detail perspective of the partitions and their adjuncts. Fig. 3 is a vertical section of a feeder and mold. Fig. 4 is a perspective of mold with material in layer. Fig. 5 is a perspective of the cut-off gate.

Let A B indicate the casing, which is divided into interior compartments 1 2 3 4 5 by partitions 6 7 8 9. Any convenient number of partitions may be used, as will be understood. The lower ends of the partitions 6 7, &c., are hollow, so as to admit vertically-sliding division-plates 10. These division-plates may be withdrawn within the hollow partitions or may be extended, as will be explained, and when so extended plates 10 form practical continuations of the lower vertical portions of partitions 6 7, &c. The upper part A of the casing is preferably flaring, so that a larger quantity of material can be stored therein than would otherwise be the case. The lower body B has parallel sides, and the partitions are arranged vertically therein. The casing B is open at the bottom, but has side plates C, forming downward extensions, at the sides. These plates C are curved outwardly, as indicated at D, to form guideways for the cut-off plate E. Plates 10 have ears 11, which project out through slots 12 in the sides of part B of the casing. These ears are connected by rod 13 to the lugs 14 on plates F, which plates F slide in vertical guideways G on the outside of the casing. Links 15 are pivotally connected to plates F and also to the operating lever or handle 29, which handle or lever is pivoted to the casing at convenient location. Cut-off plate E is slotted, as indicated at 21, to permit of the passage of the vertically-moving plates 10. The plates F are preferably slotted at their lower edges, so as to receive plates 10. The mold-box M is of such size as to neatly fit within the downwardly-extended edges of plates C and is of usual construction.

Now, assuming the cut-off plate E to be shoved under the lower end of the part B of the compartment-box, casing, or hopper A B and the plates 10 to have their lower edges in slots 21 in the plate E, the plates 10 are pressed down until they reach the bottom of mold M and form neatly-fitting partitions within said mold-box. The compartments 1 2, &c., are filled with ice-cream of different colors or flavors, and the material extends between the partitions in the casing. By withdrawing plate E in its guideways D the material is allowed to fall down into the mold and is there retained, separated by plates 10. Then by pushing in plate E the cream in the mold is cut off from that in the casing. Then lift plates 10 and the casing may now be removed and placed on another mold, where the operation may be repeated. When handle 29 is pressed down, the side plates F move down at the sides of part B of the casing and close the slots therein, which prevents escape of the cream while the mold is filling.

The plate E is preferably strengthened by ribs K, which run parallel with slots 21 in said plate E. The bottom of the casing is grooved to correspond.

From the foregoing it is believed the operation of the machine will be understood. It requires only that the compartments in the the casing be supplied with material, and a mold can be filled therefrom by simply moving down the partitions 10 and withdrawing and restoring plate E, when the partitions 10 may be lifted and the filled mold removed.

The plates 10 and the cut-off plate E are easily removable for cleansing, and the casing or filling-receptacle being open at both ends is quite accessible for a like purpose.

What is claimed is—

1. In a mold-filling machine, the combination of the casing open at bottom, hollow vertical partitions in the casing, vertically-sliding plates in said hollow partitions, and a cut-off plate at the bottom of the casing.

2. In a mold-filling machine, the combination of the open bottom casing flaring at the top, vertical hollow partitions in said casing, vertically-sliding plates in said partitions, and means for moving them from outside the casing, and a slotted cut-off plate through which slots the lower ends of the vertically-sliding plates move, substantially as described.

3. In a mold-filling machine, the combination of the casing having vertical partitions, vertically-moving plates which when depressed form extensions of said partitions, means for lifting said plates, a transversely-sliding cut-off plate having slots through which the vertically-movable plates pass, and a mold of substantially the area of the lower end of the casing, substantially as described.

4. In a machine as described, the casing having its lower portion constructed with slotted parallel sides, vertically-movable plates having ears extending through said slots in the casing, covering-plates outside the casing to which the ears are connected and means for lifting said covering-plates, substantially as described.

5. The combination of the slotted casing, the vertically-movable plates therein having lugs extending through said slots, the covering-plates outside said casing connected to said lugs, and the links and forked lever connected to said covering-plates, substantially as described.

6. The combination with the open-bottomed casing or filling-receptacle, of vertically-movable plates extensible from the bottom thereof, a mold corresponding to the bottom of the casing into which the plates are extended, thereby forming partitions in the mold, and a cut-off gate movable below the bottom of the filling-receptacle.

In testimony whereof we affix our signatures in presence of witnesses.

GEORGE W. CUSCADEN.
CHARLES F. KLOTZ.
HARRY A. CUSCADEN.

Witnesses to the signatures of Geo. W. Cuscaden and Chas. F. Klotz:
JAMES T. A. BAKER,
THOMAS S. PFEIFFER.

Witnesses as to H. A. Cuscaden:
PHILIP HEUSER,
THOMAS M. DIXON.